United States Patent [19]

Steckler

[11] 3,875,211
[45] Apr. 1, 1975

[54] PROCESS FOR PREPARING 2-HYDROXYALKYLACRYLATES AND -HYDROXYALKYLMETHACRYLATES

[75] Inventor: Robert Steckler, Crofton, Md.

[73] Assignee: Alcolac Inc., Baltimore, Md.

[22] Filed: Jan. 22, 1973

[21] Appl. No.: 325,840

[52] U.S. Cl. ............................................. 260/486 B
[51] Int. Cl. ........................................... C07c 69/54
[58] Field of Search ................................. 260/486 B

[56] References Cited
UNITED STATES PATENTS
3,125,592   5/1964   Nevin.............................. 260/486 B Primary Examiner—Lorraine A. Weinberger
Assistant Examiner—Paul J. Killos
Attorney, Agent, or Firm—George L. Tone

[57] ABSTRACT

2-hydroxyalkyl esters of acrylic and methacrylic acids, such as 2-hydroxyethylacrylate and 2-hydroxethylmethacrylate, are prepared in good yield and high purity by the reaction of an alkylene oxide, such as ethylene oxide, with acrylic acid or methacrylic acid in the presence of a trivalent chromium salt, preferably the trivalent chromium salt of complexing acids, such as salicylic acids, as a catalyst. Advantageously, a minor amount of a polymerization inhibitor, such as hydroquinone, or di-B-naphthyl-p-phenylene diamine, may be present during the reaction, if desired.

16 Claims, No Drawings

PROCESS FOR PREPARING 2-HYDROXYALKYLACRYLATES AND -HYDROXYALKYLMETHACRYLATES

BACKGROUND OF THE INVENTION

The present invention relates to a process of making 2-hydroxyalkyl acrylates and 2-hydroxyalkyl methacrylates, in high yield and purity, by the reaction of an alkylene oxide with acrylic acid or methacrylic acid respectively, while using a trivalent chromium salt as a catalyst.

Such 2-hydroxyalkyl acrylates and methacrylates as 2-hydroxyethyl methacrylate, 2-hydroxyethyl acrylate, 2-hydroxypropyl acrylate, 2-hydroxypropyl methacrylate, 2-hydroxybutyl acrylate and 2-hydroxybutyl methacrylate have been available commercially for a number of years. These 2-hydroxyalkyl acrylates and methacrylates have utility as polymerizable monomers, (a utility first described in U.S. Pat. No. 2,129,722), both for homopolymerization and also for copolymerization in admixture with other polymerizable monomers containing a terminal $CH=CH_2$ radical, such as styrene, vinyl toluene, acrylates, methacrylates, acrylamide, acrylonitrile, etc. They are also useful as cross-linking monomers in combination with unsaturated polyester resins (e.g., those which include maleic acid, fumaric acid and the like), diallyl phthalate and the like.

The production of such 2-hydroxyalkyl esters by the reaction of acrylic acid or methacrylic acid with an alkylene oxide in the presence of various catalysts has been described in a number of patents. Among the catalysts that have been disclosed in the patent literature for this reaction are the following: tertiary amine and pyridine catalysts disclosed in U.S. Pats. Nos. 2,484,487; 2,819,296 and 2,929,835; alkali metal salts of acrylic and methacrylic acid such as sodium, potassium and lithium acrylate or methacrylate disclosed in U.S. Pat. Nos. 3,038,886; 3,314,988 and 3,433,824; tetraalkyl ammonium salts disclosed in U.S. Pat. Nos. 3,059,024 and 3,373,188; quaternary pyridinium salts disclosed in British Pat. No. 1,096,035; aluminum trichloride disclosed in U.S. Pat. No. 3,150,167; halogen free organic derivatives of trivalent phosphorus- such as triphenylphosphine- disclosed in British Pat. No. 1,125,682 and U.S. Pat. No. 3,373,188; and a catalyst system consisting of a trivalent iron compound as catalyst and copper, mercury, chromium, iodine or certain compounds of any of them as promoters disclosed in U.S. Pat. No. 3,441,599.

While substantial improvements have been effected over the years particularly, in the rate of reaction, yield of the desired 2-hydroxyalkyl acrylates and methacrylates and to some extent in the purity of the products, the commercially available 2-hydroxyalkyl acrylates and methacrylates still suffer from one or more of the following deficiencies:

a. - Poor color.- The optimum color for polymerizable monomers is essentially water-white.

b. - High Acrylic or Methacrylic acid content.- Commercial 2-hydroxyalkyl acrylates and methacrylates usually contain from 1%-6% of unreacted acrylic or methacrylic acid.

c. - High content of by-products.- The commercial esters contain appreciable amounts of glycol, polyethers (of the formula $$CH_2=C-COO-CH_2-CH-OOC-C=CH_2).$$
$$\phantom{CH_2=}R^2 \phantom{-COO-CH_2-}R^1 \phantom{-OOC-}R^2$$

The diesters act as a cross-linker during polymerization and thus are particularly undesirable.

Purification of an impure 2-hydroxyalkyl ester of acrylic or methacrylic acid presents a number of problems. Careful fractional distillation under vacuum can be used to obtain such esters in high purity, but is not economically attractive since only a center cut or fraction of high purity is obtained with a substantial amount of the desired ester being discarded in fore-runs or still bottoms. The removal of unreacted acrylic or methacrylic acid by a process involving a treatment of the crude material with alkali, to convert the unreacted acid to a salt, suffers from the disadvantage that the alkali treatment tends to cause the rearrangement of the desired mono-ester into the undesired diester and glycol.

U.S. Pat. No. 3,373,188, supra, discloses a process in which an alkylene oxide is reacted with acrylic or methacrylic acid in the presence of tetramethyl ammonium chloride, triphenyl phosphine or triphenyl stibine as an esterification catalyst and phenyl pyrazolidone as a polymerization inhibitor. The patent states- "The final acid number of the esterification reaction product in the range of 5 to 20 is preferred. Diacrylate contamination results when the acid number is forced to very low values via esterification."- The acid value of the reaction product, and thus its content of unreacted acrylic or methacrylic acid, was then reduced by storage for one week at room temperature. I have found that the product obtained in this manner contained substantial amounts of unreacted alkylene oxide and a relatively high percentage of diester. In addition, this process is very expensive as it would require storing the crude monomer for one week in a reactor as it is not considered safe to store the incompletely reacted product in drums or other low pressure storage tanks.

U.S. Pat. No. 3,441,599, supra, discloses a process for the production of 2-hydroxyalkyl acrylates and methacrylates by reacting an alkylene oxide with acrylic or methacrylic acid while employing a catalyst system consisting of an iron (III) compound as a catalyst and one or more of copper, a copper compound, mercury, a mercury compound, chromium, a chromium compound, iodine and a mutual compound of these elements as promoters. The patent reports production of a crude product in which the yield of 2-hydroxyalkyl acrylate or methacrylate was 94–96 percent and following distillation, a recovery in the range of about 86 – 88% of theory of a 2-hydroxyalkyl acrylate or methacrylate of 99 percent purity by weight and having a color in the range of APHA 0–5.

SUMMARY OF THE INVENTION

I have discovered that the salts of trivalent chromium with organic acids are outstanding catalysts for the production of 2-hydroxyalkyl esters of acrylic and methacrylic acid by the reaction of a vicinal alkylene oxide (e.g., ethylene oxide, propylene oxide or butylene oxide) with acrylic acid or methacrylic acid, as illustrated in the following equation:

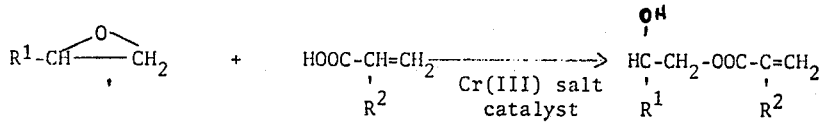

wherein: $R^1$ = H, $-CH_3$ or $-C_2H_5$ and $R^2$ = H or $-CH_3$

The reaction proceeds rapidly at temperatures of from room temperature to 100° C. or higher to give a high yield of the desired 2-hydroxyalkyl acrylate or methacrylate of high purity, equal or better in purity to that of commercially available 2-hydroxyalkyl acrylates or methacrylates and in the case of my most preferred Cr(III) salicylate catalysts having an outstandingly lower content of such undesired impurities as unreacted acrylic or methacrylic acid, diesters and glycol.

DESCRIPTION OF THE PREFERRED EMBODIMENTS

The salts of trivalent chromium, Cr(III), with organic acids, which may be used as catalysts in the process of the present invention, may be the simple salts of Cr(III) with fatty acids, or a dimer fatty acid, of from 1 to 36 carbon atoms such as chromium octoate $Cr(-OOC-C_7H_{15})_3$, chromium laurate, chromium oleate, chromium stearate, etc., or a carbocyclic carboxylic acid such as chromium benzoate, chromium abietate, chromium naphthenates, etc. I particularly prefer Werner-type complexes in which fatty acids, or carbocyclic carboxylic acids of from 6 to 22 carbon atoms, are coordinated with chromium (III). Such Werner-type complexes may be represented by the following configuration:

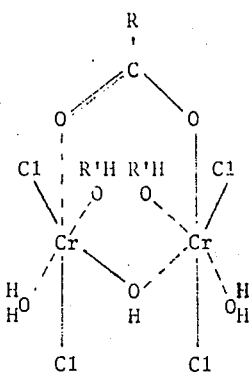

These may be exemplified by the Werner-type complexes described in U.S. Pat. Nos. 2,273,040; 2,356,161; and 2,524,803 to Iler and No. 2,975,018 to Schubert et. al. Certain of these materials are commercially available from duPont, Wilmington, Delaware, under the trade-name QUILON chrome complexes as solutions in isopropanol, as Quilon M made from myristic acid, Quilon S made from stearic acid and Quilon C from $C_{14}$ to $C_{18}$ fatty acids. A similar complex is available from CAL Chemical Corporation, Coventry, Rhode Island, under the trade-name CALON A. I more particularly prefer the chromium (III) complexes (chelates) of aromatic carboxylic acids having a hydroxy (or other substituent having an active hydrogen, such as a sulfhydryl group) ortho to the carboxyl group. As examples of this preferred group of catalysts may be mentioned the Cr(III) complexes of salicylic acids; e.g., salicylic acid, thiosalicylic acid, 3,5-diisopropyl salicylic acid, methylene bis-salicylic acid, 2-hydroxy-1-naphthoic acid, 1-hydroxy-2-naphthoic acid, etc.

The amount of such Cr(III) catalyst as is used is not highly critical but preferably is in the range of from about 0.1 percent to about 5.0 percent, by weight, of the acrylic or methacrylic acid; smaller amounts down to about 0.05 percent by weight of the acid, or larger amounts up to a saturated solution of the catalyst in the acrylic acid or methacrylic acid may be used; high catalyst levels accelerate the reaction and permit reaction at lower temperatures. In addition, this produces excellent quality and extremely low diester content. However, costs are higher due to the high amount of still residue containing the catalyst, which must be recycled.

Temperatures in the range used in the prior art for this reaction, usually of from room temperature to 100°C., have been found to be satisfactory for the reaction. Temperatures above 100°C. can be used and will correspondingly accelerate the reaction, but are less preferred due to the danger of premature polymerization. My preferred temperature range is from about 50°C. to about 90°C. and particularly from about 70°C. to about 80°C., at these temperatures the reaction is completed in good time and with minimum production of byproducts and impurities.

To assure against premature polymerization in the course of the reaction of the alkylene oxide with acrylic acid or methacrylic acid, particularly when this reaction is effected at slightly elevated temperatures, with resultant contamination of the reaction product with acrylate or methacrylate polymer, I prefer to incorporate a small amount of a polymerization inhibitor into the reaction mixture. A number of suitable polymerization inhibitors are known, these include: hydroquinone, monomethyl ether of hydroquinone, N,N'-diphenyl-p-phenylene diamine, para hydroxy diphenyl amine, di-beta-naphthyl-p-phenylene diamine and di-tert.-butyl-para-cresol (Ionol.) Of these, I particularly prefer di-beta-naphthyl-p-phenylene diamine, since a product of very low diester content has been obtained through its use.

The details of the present invention will be apparent to those skilled in the art from the specific examples which follow and which illustrate preferred embodiments thereof. In these examples, the reaction was effected in an autoclave equipped with suitable means for agitation, thermometer, and with indirect heat exchange means, coil or jacket, for controlling the temperature of the reaction by heating or cooling as needed. The parts are by weight.

EXAMPLE I.

65.3 parts of glacial methacrylic acid, 0.18 parts of monomethyl ether of hydroquinone and 0.25 parts of chromium sllicylate,

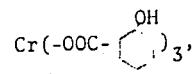

were charged into the autoclave. Air was displaced by purging with nitrogen and 36.8 parts of ethylene oxide was then added gradually while raising the batch temperature to 80°C. during 20 minutes. The batch was held at 80°C. for three hours. Excess ethylene oxide was removed by pulling vacuum on the autoclave while cooling to room temperature. The reaction product, crude 2-hydroxyethyl methacrylate, had the following composition, analyzed by gas chromatography:

| | |
|---|---|
| Ethylene glycol mono methacrylate | 93.2% |
| Diethylene glycol mono methacrylate | 5.2% |
| Ethylene glycol | Nil |
| Methacrylic acid | 0.08% |
| Ethylene glycol dimethacrylate | 0.15% |

The reaction product was distilled under good vacuum in a Luwa wiping film evaporator at 84°–88°C. and 5-6 mm. (mm. Hg absolute) to remove the catalyst and recover the 2-hydroxyethyl methacrylate monomer as a colorless liquid having essentially the same composition as that of the reaction product given above.

The experiment was repeated except that the still bottom from the above experiment, containing the catalyst, was used as the sole catalyst. The results were essentially the same. Such reuse of the still bottom as the catalyst in a subsequent batch has the advantage that loss of 2-hydroxyethyl methacrylate in the still bottoms is minimized, thus producing essentially quantitative yields and greatly reducing over-all catalyst cost.

EXAMPLE II.

35.9 parts methacrylic acid, 0.05 parts monomethyl ether of hydroquinone and 0.29 parts chromium diisopropyl salicylate were charged into an autoclave and purged as in Example I. 19.35 parts ethylene oxide were added gradually while raising the batch temperature to 70°C. and showed the following composition by gas chromatography:

| | |
|---|---|
| Ethylene glycol mono methacrylate | 94.6% |
| Diethylene glycol mono methacrylate | 5.0% |
| Ethylene glycol | Nil |
| Methacrylic acid | 0.06% |
| Ethylene glycol dimethacrylate | 0.12% |

The colorless 2-hydroxylethyl methacrylate monomer was obtained by vacuum distillation at 85°–88°C. and 5-6 mm. vacuum, as in Example I, as a colorless liquid. The viscous still bottom containing the catalyst could be reused in a subsequent batch, thus producing practically quantitative yields.

Chromium diisopropyl salicylate, used as the catalyst in this Example II, is a mixture of:
 tris (3,5-diisopropyl salicylato) chromium (III) and
 bis (3,5-diisopropyl salicylato) hydroxoaquo chromium (III) characterized by the following configuration:

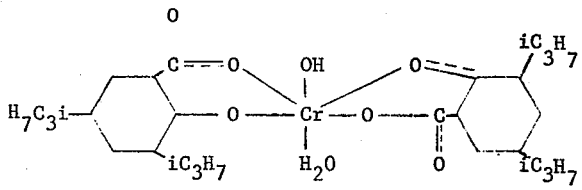

and substatially similar results are obtained when either of these components is used as the catalyst.

EXAMPLE III.

262.7 parts of glacial methacrylic acid, 2.06 parts Quilon C and .3 parts MEHQ were charged and purged as in Example I. 134.4 parts ethylene oxide were added as in Example II and the reaction mixture held seven hours at 70°C. The crude reaction product had the following composition:

| | |
|---|---|
| Ethylene glycol mono methacrylate | 89.1% |
| Diethylene glycol mono methacrylate | 6.6% |
| Ethylene glycol | Nil |
| Methacrylic acid | 0.16% |
| Ethylene glycol dimethacrylate | 1.0% |

Distillation, as in Example I, produced the colorless 2-hydroxyethyl methacrylate monomer and the residue could be reused, as catalyst, in subsequent batches.

EXAMPLE IV.

Example III was repeated except that Quilon M replaced Quilon C. The batch was held 11 hours at 70°C. The reaction product had the following composition:

| | |
|---|---|
| Ethylene glycol mono methacrylate | 88.4% |
| Diethylene glycol mono methacrylate | 7.7% |
| Ethylene glycol | Nil |
| Methacrylic acid | 2.4% |
| Ethylene glycol dimethacrylate | 0.51% |

Distillation, as in Example I, produced the colorless 2-hydroxyethyl methacrylate monomer. The still bottom could be reused, as catalyst, in subsequent batches.

EXAMPLE V.

Example III was repeated, but 2.0 parts chromium octoate were used as a catalyst in place of Quilon C. After four hours at 70°C., the reaction product analyzed as follows:

| | |
|---|---|
| Ethylene glycol mono methacrylate | 92.8% |
| Diethylene glycol mono methacrylate | 2.3% |
| Ethylene glycol | Nil |
| Methacrylic acid | 2.9% |
| Ethylene glycol dimethacrylate | 0.55% |

The colorless monomer was obtained by vacuum distillation as in Example I and the still bottom could be reused in subsequent batches as the catalyst.

EXAMPLE VI.

200 parts glacial methacrylic acid, 0.2 parts hydroquinone and 50 parts chromium diisopropyl salicylate were charged into an agitated autoclave, evacuated and purged with nitrogen and heated to 35°C. 105 parts ethylene oxide were added during 12 minutes and the batch held at 40°–42°C. After two hours, a small amount of unreacted ethylene oxide was removed in vacuum. The crude monomer analyzed as follows:

| | |
|---|---|
| Monomethacrylate of ethylene glycol | 96.0% |
| Monomethacrylate of diethylene glycol | 3.2% |
| Ethylene glycol | Nil |
| Methacrylic acid | 0.05% |
| Ethylene glycol dimethacrylate | 0.06% |

The colorless 2-hydroxyethyl methacrylate monomer was obtained by distillation in vacuum, and the residue, containing the catalyst, re-used in subsequent batches.

EXAMPLE VII.

400 parts glacial acrylic acid, 3.75 parts chromium diisopropyl salicylate and 6.8 parts para hydroxy diphenyl amine were loaded into an autoclave, evacuated, purged with nitrogen and 250 parts ethylene oxide added at 40°–80°C. during 16 minutes. The reaction was continued three hours at 80°–85°C., excess ethylene oxide removed in vacuum, and cooled to room temperature.
The crude monomer analyzed as follows:

| | |
|---|---|
| Ethylene glycol mono acrylate | 88.46% |
| Diethylene glycol mono acrylate | 8.06% |
| Ethylene glycol diacrylate | 0.39% |
| Acrylic acid | 0.16% |

The colorless hydroxyethyl acrylate was obtained by distillation in vacuum, as in Example I at 80°–86°C. at 4–7 mm. The residue containing the catalyst could be reused in subsequent batches.

EXAMPLE VIII.

271 parts butylene oxide, 271 parts glacial acrylic acid, 1.2 parts MEHQ and 7.8 parts chromium diisopropyl salicylate were charged into a three-neck flask, heated with agitation to 70°C. in 35 minutes. An exothermic reaction started and the batch was kept at 70°–75°C. with external cooling. After 45 minutes, the exotherm ceased. Heating was continued two hours at 65°C. The reaction product was distilled from the catalyst in vacuum at 80°–90°C. and approximately 3-4 mm. pressure. The distillate analyzed as follows:

| | |
|---|---|
| Acrylic acid | Nil |
| Hydroxybutyl acrylate | 98.9% |

EXAMPLE IX.
(comparative)

As illustrated by the following experiments, manganese and vanadium salicylates were found to be ineffective as catalysts, thus indicating that the salicylate ion is not the significant ingredient of the catalyst.

A. 200 parts of methacrylic acid, 0.3 parts of monomethyl ether of hydroquinone and 2.5 parts of manganese salicylate were charged into the autoclave and purged as in Example I. 105 parts of ethylene oxide were added and the reaction mixture held for two hours at 80°C. The pressure in the autoclave remained constant during this time, indicating absence of reaction between the ethylene oxide and the methacrylic acid.

B. The experiment described in paragraph A), immediately above, was repeated, except that 2.5 parts of vanadium salicylate was substituted for the manganese salicylate as the catalyst. During two hours at 80°C., no pressure drop occurred, indicating the absence of reaction.

It will be understood that the forgoing Examples I–VIII are illustrative only of certain preferred embodiments of the present invention and that various changes and modifications which will suggest themselves to those skilled in the art may be made therein.

Thus, in place of charging all of the alkylene oxide to the reactor as part of the initial charge, as was done in the Examples, the alkylene oxide may be added incrementally or continuously over the course of the reaction. The reaction is advantageously carried out under autogenous pressure or under nitrogen pressure in the reactor; but, if desired, lower pressures, such as atmospheric pressure, may be employed but are less attractive economically since this would necessitate very long reaction cycles. Higher pressures afford no advantages and therefore, are not necessary. The amount of alkylene oxide used should be at least equal to the amount theoretically required to react with the acrylic acid or methacrylic acid to form the 2-hydroxyalkyl mono ester which is desired, as in the forgoing examples a small excess of alkylene oxide, up to 10% excess or somewhat more may be used to advantage; but with the catalysts of the present invention, there appears to be no advantage in the large excesses of alkylene oxide, up to a three fold molar excess suggested in British Pat. No. 1,125,682 or up to an eight fold excess suggested in U.S. Pat. No. 3,433,824 as being desirable.

The amount of polymerization inhibitor, when one is used, may be that used in the prior art; it preferably is used in the amount of from 0.001 to 1.0 percent by weight of the acrylic or methacrylic acid, preferably from about 0.1 to 0.5 percent by weight. As indicated by the following serious of experiments, there appears to be no advantage in increased amounts of such inhibitors.

A series of bottle experiments were run at 80°C. for two hours to determine the effect of changes of amount of inhibitor, di-beta-naphthyl-p-phenylene diamine in all experiments, and of amount of catalyst, Cr(III) diisopropyl salicylate in all experiments, or in the reaction of methacrylic acid with ethylene oxide. The amount of ethylene glycol dimethacrylate in the reaction product was determined analytically as measure of the effect. The amount of inhibitor and catalyst used and the amount of ethylene glycol dimethacrylate contained in the reaction product, undistilled, are given, as % by weight, in Table I.

Table I

| % Inhibitor | % Catalyst | % Ethylene glycol dimethacrylate |
|---|---|---|
| 0.25 | 0.25 | 0.13 |
| 0.50 | 0.25 | 0.13 |
| 0.25 | 1.25 | 0.06 |
| 0.50 | 1.25 | 0.08 |
| 0.25 | 2.25 | 0.05 |

When propylene oxide or butylene oxide are reacted with acrylic acid or methacrylic acid, some of the 2-hydroxyalkyl ester which is produced may be that in which the hydroxyl group of the glycol which is esterified is that of the secondary alcohol and the free hydroxy group is that of a primary alcohol; i.e., some of the product may have the formula

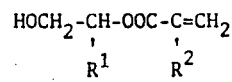

wherein $R^1$ is a methyl or ethyl group and $R^2$ is hydrogen or methyl; however, the ester is preponderantly that in which the free hydroxyl group is that of a secondary alcohol and the esterified hydroxyl is that of a primary alcohol.

In the course of a relatively simple vacuum distillation of the reaction product of the present invention, as was employed in the Examples, the composition of the product is not materially changed, except for the removal of colored impurities and catalyst which remain in the still bottoms. There may be a slight reduction in the amount of unreacted acrylic acid or methacrylic acid in the distilled product as compared to the crude reaction product, particularly in the case of products containing 1% or more of unreacted acid, but otherwise, the distilled product has the same basic composition as the "crude" reaction product. It is particularly surprising that with the catalysts of the present invention, a product with a very low content of both unreacted acid and diesters is obtained, since in the prior art, as exemplified by U.S. Pat. No. 2,929,835 and 3,373,188 and British Pat. No. 1,125,682, the products are usually characterized by a relatively high content of diester and polymer.

I claim:

1. In the process of preparing a compound selected from the group consisting of 2-hydroxyalkylacrylates and 2-hydroxyalkylmethacrylates by the reaction of an acid selected from the group consisting of acrylic acid and methacrylic acid with a vicinal alkylene oxide having 2 to 4 carbon atoms; the improvement which comprises: carrying out said reaction in the presence of a small amount of a Werner-type chromium (III) complex wherein an organic acid selected from the group consisting of (a) fatty acids of from 6 to 22 carbon atoms; and (b) salicylic acids and naphthoic acids having a hydroxyl group in ortho position to the carboxyl group are coordinated with chromium (III), as a catalyst; and from 0 to about 1 percent, by weight of said acid, of a polymerization inhibitor for said acid.

2. The process as defined in claim 1, wherein said polymerization inhibitor is selected from the group consisting of hydroquinone, monomethyl ether of hydroquinone, N,N'-diphenyl-p-phenylene diamine, p-hydroxy diphenyl amine, di-beta-naphthyl-p-phenylene diamine and di-tert. butyl-p-cresol and is present in the amount of from about 0.1 percent to about 1.0 percent, by weight, of said acid.

3. The process as defined in claim 1, wherein said catalyst is a Werner-type chromium complex wherein a fatty acid of from 14 to 18 carbon atoms is coordinated with chromium (III).

4. The process as defined in claim 3, wherein said polymerization inhibitor is selected from the group consisting of hydroquinone, mono methyl ether of hydroquinone, N,N'-diphenyl-p-phenylene diamine, p-hydroxy diphenyl amine, di-beta-naphthyl-p-phenylene diamine and di-tert. butyl p-cresol and is present in the amount of from about 0.1 percent to about 1.0 percent, by weight, of said acid.

5. The process as defined in claim 1, wherein said catalyst is a chromium (III) complex of a salicylic acid.

6. The process as defined in claim 2, wherein said catalyst is a chromium (III) complex of a salicylic acid.

7. The process as defined in claim 5, wherein said catalyst is chromium salicylate.

8. The process as defined in claim 6, wherein said catalyst is chromium salicylate.

9. The process as defined in claim 5, wherein said catalyst is chromium diisopropyl salicylate.

10. The process as defined in claim 6, wherein said catalyst is chromium diisopropyl salicylate.

11. The process as defined in claim 5, wherein said catalyst is tris (3,5-diisopropyl salicylate) chromium-(III).

12. The process as defined in claim 6, wherein said catalyst is tris (3,5-diisopropyl salicylate) chromium-(III).

13. The process as defined in claim 5, wherein said catalyst is bis (3,5-diisopropyl salicylate) hydroxoaquo chromium(III).

14. The process as defined in claim 6, wherein said catalyst is bis (3,5-diisopropyl salicylate) hydroxoaquo chromium(III).

15. In the process of preparing a compound selected from the group consisting of 2-hydroxyalkylacrylates and 2-hydroxyalkylmethacrylates by the reaction of an acid selected from the group consisting of acrylic acid and methacrylic acid with a vicinal alkylene oxide having 2 to 4 carbon atoms; the improvement which comprises carrying out said reaction in the presence of a small amount of chromium (III) octoate as a catalyst and of from 0 to about 1 percent, by weight of said acid, of a polymerization inhibitor for said acid.

16. The process as defined in claim 15, wherein said polymerization inhibitor is selected from the group consisting of hydroquinone, mono methyl ether of hydroquinone, N,N'-diphenyl-p-phenylene diamine, p-hydroxy diphenyl amine, di-beta-naphthyl-p-phenylene diamine and di-tert. butyl-p-cresol and is present in the amount of from about 0.1 percent to about 1.0 percent, by weight, of said acid.

* * * * *

UNITED STATES PATENT OFFICE
CERTIFICATE OF CORRECTION

PATENT NO. : 3,875,211
DATED : April 1, 1975
INVENTOR(S) : Robert Steckler

It is certified that error appears in the above-identified patent and that said Letters Patent are hereby corrected as shown below:

In the Title, on the Title Page, column 1, line 3 and in the Specification, Column 1, line 3:
" -Hydroxyalkylmethacrylates" should read -- 2-Hydroxyalkylmethacrylates --.

Column 1, after line 68, insert the following:
-- $H_2C=C-COO-CH_2-CH-O-CH_2-CHOH$
       $R^2$         $R^1$      $R^1$ wherein $R^1$ = H, $-CH_3$ or $-C_2H_5$ and
$R^2$ = H or $-CH_3$)

and diesters of the formula --.

Column 4, line 67: "sllicylate" should read -- salicylate --.

Column 5, line 65: that portion of the formula reading

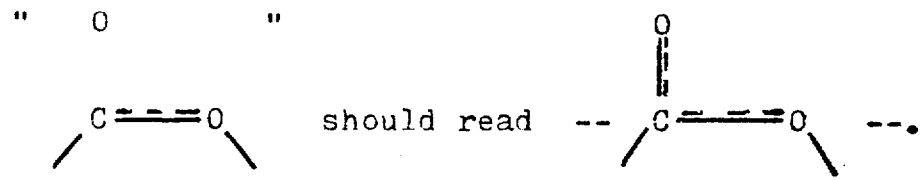

should read

Column 8, line 25: "serious" should read -- series --.

Signed and Sealed this fourth Day of November 1975

[SEAL]

Attest:

RUTH C. MASON
*Attesting Officer*

C. MARSHALL DANN
*Commissioner of Patents and Trademarks*